April 16, 1957 P. B. THAMES, JR 2,789,239
AMORTISSEUR WINDING
Filed Dec. 29, 1955 2 Sheets-Sheet 1
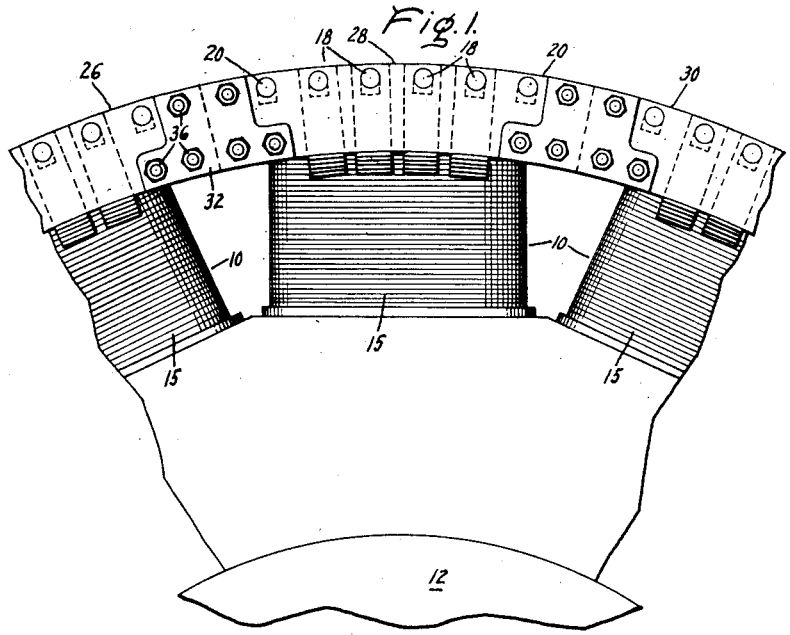
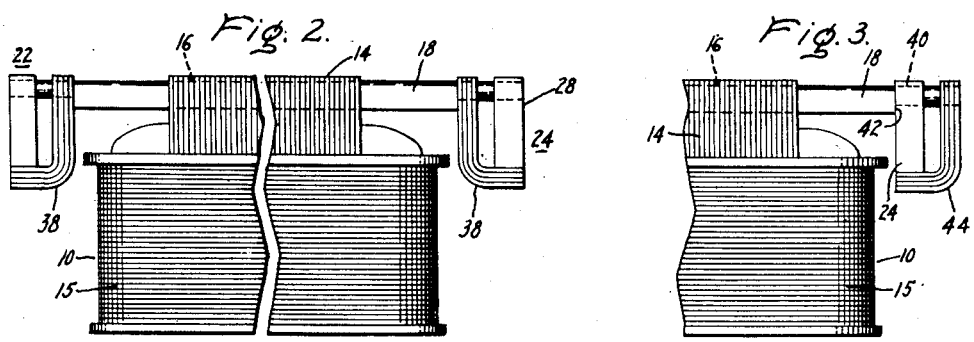
Inventor:
Preston B. Thames, Jr.,
by
His Attorney.

April 16, 1957     P. B. THAMES, JR     2,789,239
AMORTISSEUR WINDING
Filed Dec. 29, 1955                     2 Sheets-Sheet 2
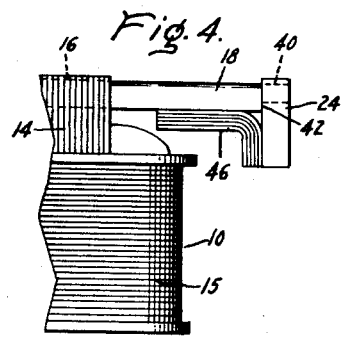
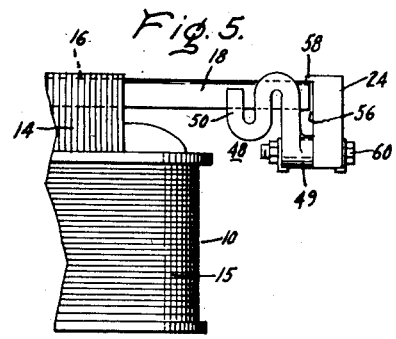
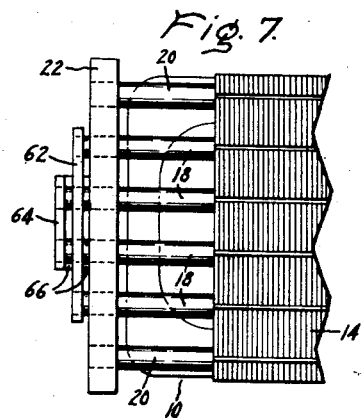
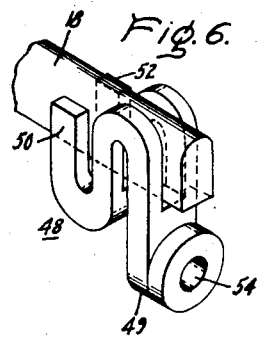
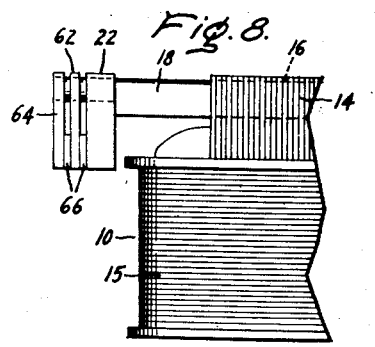
Inventor:
Preston B. Thames, Jr.,
by    *His Attorney.*

United States Patent Office 2,789,239
Patented Apr. 16, 1957

2,789,239

AMORTISSEUR WINDING

Preston B. Thames, Jr., Schenectady, N. Y., assignor to General Electric Company, a corporation of New York Application December 29, 1955, Serial No. 556,127

10 Claims. (Cl. 310—183)

The invention described herein relates to dynamoelectric machines and more particularly to an amortisseur winding adapted for use with synchronous motors and generators and has for its object the provision of a winding capable of eliminating the undesirable effects of differential thermal expansion resulting from the flow of currents of different values through spaced bars of the winding.

The use of a squirrel cage or amortisseur winding inserted in the poles of a rotor for a synchronous machine for starting the machine by induction-motor action is well known, as is also the use of such a winding for damping purposes when used with a generator. Likewise, the differential thermal expansion of bars in the winding, caused by currents of different values flowing in the various bars, resulting in severe tensile and compressive stresses in the bars and end ring connection segments, is also known to those working in the motor and generator manufacturing industry. In order to alleviate the adverse effects caused by such tensile and compressive stresses, resort has been made for example, to the use of heavy rigid structures, or by providing a plurality of slits extending through each end connection ring segment, to form a series of flexible portions respectively adapted to receive the ends of bars comprising the winding.

The result achieved by utilizing the latter type structure is that the portions are given sufficient resiliency to accommodate the differential thermal expansion of each bar in the winding. It has been found however that if the machine is operated under conditions which exceed the design specifications, the above described structures fail and replacement of parts and sometimes the whole machine is necessary.

Further, the varied services required to be performed by synchronous motors and generators, has led to development of machines having larger electrical power ratings and increased speed. These two factors have increased the peripheral speed of the windings to an extent where prior supporting structures no longer provide full protection for the machine. It is evident that the combined effect of centrifugal force caused by increased speed and the overextended use of the machine requires either that the windings be made of lighter and stronger materials to accept the centrifugal and differential thermal expansion forces or that the windings be supported in a manner to negative the forces applied to the winding. The electrical characteristics of the material used in the windings precludes the use of substitute materials and the only remedy therefore available is that of modifying existing structures to arrive at proper supporting means for the winding. This invention is directed to such modifying structure.

In carrying out my invention, I eliminate the problems disclosed above, by providing in its preferred form, a flexible connector between the bars of an amortisseur winding and the end ring connection segments for permitting differential thermal expansion in the amortisseur bars without imposing appreciable stresses upon the end ring connection segments.

Other objects and many of the attendant advantages of this invention will be readily appreciated as the same becomes better understood by reference to the following detailed description when considered in connection with the accompanying drawings wherein:

Figure 1 is a partial end view of a rotor showing an amortisseur winding installed in the poles for the machine;

Figure 2 is a side view in elevation, showing the arrangement of a flexible connector positioned between the ends of an amortisseur bar and an end ring connection segment for the winding;

Figure 3 is a modification showing a flexible connector positioned exteriorly of an end ring connection segment;

Figure 4 is another modification illustrating a connector attached to the inwardly directing portions of a bar and an end ring segment;

Figure 5 is a further modification showing a serpentine shaped member interconnecting a bar with an end ring connection segment for the winding;

Figure 6 is a perspective view of the device shown in Figure 5;

Figure 7 is a plan view of still another modification of the invention illustrating the use of a plurality of end ring connection segments; and Figure 8 is a side view of the structure shown in Figure 7.

Referring now to the drawings wherein like reference characters designate like or corresponding parts throughout the several views, there is shown in Figures 1 and 2, a plurality of poles 10 arranged for attachment to the rotor shaft 12 of a synchronous motor or generator. Each pole 10 is of usual construction, consisting in part, of laminations 14 and a winding 15, and is provided adjacent its outer surface with a plurality of openings 16 for receiving bars of the winding. As in usual construction, bars comprising the amortisseur winding are positioned adjacent the outer peripheral surface of each pole and are arranged to extend completely around and axially of the machine rotor. In order to obtain structural support while achieving proper electrical connections, the bars are connected at their ends to a pair of end rings on opposite sides of the rotor.

Referring more specifically to the structure, there are four bars 18 centrally disposed within openings 16 and a pair of flanking bars 20 complete the set for each pole. All of the bars extend beyond the poles and terminate in free floating end rings 22 and 24, the latter being divided into a series of interconnected segments, one for each pole, as designated 26, 28 and 30 in Figure 1. As shown, the segments are attached to one another by a connecting plate 32 and bolts 36. In operation, currents of different values flow through the various bars comprising the winding and generate heat which effectively causes differential thermal expansion in the various bars. The length of the bars and the different amounts of current flowing therethrough is of sufficient value to cause expansion to an extent where stresses are imposed on the end ring connection assembly thereby creating buckling and other undesirable effects in the end rings 22 and 24.

In order to alleviate this condition, a flexible L-shaped connector 38, consisting of a plurality of laminations is slipped on and brazed to an end of each bar, the other end of the connector being brazed or otherwise affixed to the inside portion of its respective end ring connection segment, such as segment 28 in Figure 2. In this structure, the end of the bars are adapted to loosely fit within corresponding openings in the end rings and when longitudinal expansion takes place in the bars, the forces created by such expansion is absorbed by the flexible member interconnecting each bar with the end ring thereby completely eliminating the application of undesirable stresses to the end rings 22 and 24. In order to provide for proper support of the end rings 22 and 24, the outermost bars 20 are not flexibly connected to the end rings but are firmly anchored therein in a manner according to prior practices. It is to be understood however, that the bars 20 could be flexibly connected in the same manner as bars 18, or any combination of flexible and rigid connections for the various bars could be made.

In the modification shown in Figure 3, each bar 18 is also loosely fitted within the end rings, as shown at 40, and is provided with a shoulder 42 used in orienting the end rings in a plane perpendicular to the axis of the machine. This flexible connector 44 is likewise made of a series of laminations and is provided with an opening of a size to fit on the end of a bar 18, which in this modification, extends beyond the end ring. The connector 44 is brazed or otherwise affixed to this protruding end of the bar and is attached at its other end by brazing to the inner peripheral surface of end ring 24. It will be seen from this structure that the bars 18 are again capable of longtiudinal movement because of the floating arrangement wtihin the openings provided in the end rings. Firm electrical contact is made between the rings and bar ends by means of the flexible connector 44 provided for this purpose.

The modification shown in Figure 4 also utilizes laminated connectors 46 for providing electrical connection between the ends of bars 18 and end rings 22 and 24. In this embodiment where a single bar, end ring and connector are shown, each shoulder 42 is arranged for properly positioning the end ring in position. The flexible connector 46 is arranged to underlie bar 18 and has its ends respectively brazed to the bar and the inner face of end ring 24. As in the prior species, a floating arrangement of the bar in the ring segment is also utilized for permitting free expansion of the bar in the end rings while the connector 46 absorbs the forces normally caused by expansion.

A slightly different arrangement of flexible connector is shown in Figures 5 and 6. In this species, a piece of metal stock 48 shaped to the form as shown, is provided with a central cutaway portion which forms a bifurcated member whose ends 50 and 52 are adapted for attachment by brazing or similar means to opposite sides of an amortisseur bar 18, there being one connector at each end of each bar comprising the winding. As shown in Figure 6, member 48 terminates in a unitary base 49 which is provided with a hole 54 extending longitudinally therethrough. The bar 18 is arranged to terminate short of each end ring 22 and 24, thereby providing a space 56 to allow for expansion of the bar. The ring 24 is provided with a lip 58 which overlies the end of the bars at its upper end and is furnished with an opening at its lower end for receiving a bolt 60 which firmly anchors the base 49 to the ring segment. Since the only connection between bar 18 and ring 24 is that made by the attachment of ends 50 and 52 to the bar and base 49 to the end ring, it is evident that any differential thermal expansion created in the bar will be absorbed by serpentine members 50 and 52 thereby completely eliminating any undesirable stresses which might otherwise be imparted to the end rings.

Referring now to the embodiment disclosed in Figures 7 and 8, it will be seen that an entirely different arrangement of parts is utilized for alleviating the undesirable effects of thermal expansion in bars 18. In this arrangement, as in that disclosed in Figure 1, the end bars 20 are firmly anchored in the end ring 24 so as to prevent relative movement of an end ring with respect to a pole in which the bars are positioned. It has been found that the amount of expansion created in bars 20 is not sufficient to cause undue stress forces in the end rings because of the relatively large diameter existing between them. The centrally disposed bars 18 however, extend slidably through ring segments 22 and 24 (not shown) and terminate in auxiliary rings 62 and 64, the ends of the bars in this case also being firmly anchored to the ring segments. In order to obtain proper electrical connection between each of the rings 22, 62 and 64, washer members 66, are inserted between the rings and brazed thereto in order to obtain good electrical connection between the parts and also serving to tie each of the rings into a unitary structure.

In view of the diversity of arrangement that can be utilized in absorbing the effects of differential thermal expansion in the amortisseur bars, it will be evident that many modifications and variations of the invention are possible in light of the above teachings. It is therefore to be understood that within the scope of the appended claims the invention may be practiced otherwise than as specifically described.

What I claim as new and desire to secure by Letters Patent of the United States is:

1. An amortisseur winding for use with a dynamoelectric machine comprising a plurality of bars positioned in pole pieces on the outer peripheral surface of a rotor for said machine, end rings supported by said bars and positioned adjacent each end of said rotor and a conductor flexibly connecting said end rings with each of said bars for absorbing movement in said bars resulting from differential thermal expansion in said bars created during operation of said machine.

2. An amortisseur winding for use with a dynamoelectric machine comprising a plurality of bars positioned in pole pieces on the outer peripheral surface of a rotor for said machine, end ring means positioned adjacent each end of said rotor means supporting said end ring means comprising, a plurality of openings therein respectively engageable by the exposed ends of said bars in a manner to permit longitudinal movement of said bars in said end ring means resulting from differential thermal expansion of said bars during operation of said machine while simultaneously firmly supporting said end ring means in spacing relationship with said rotor, a conductor flexibly interconnecting each of said bars with said end ring means for absorbing said longitudinal movement and providing proper electrical connection between said bars and said end ring means.

3. An amortisseur winding for use with a dynamoelectric machine comprising a plurality of bars positioned in pole pieces on the outer peripheral surface of a rotor for said machine, end ring means positioned adjacent each end of said rotor, a plurality of openings provided in said end ring means receiving the exposed ends of said bars thereby for supporting said end ring means and for permitting longitudinal movement of said bars in said end ring means resulting from differential thermal expansion during operation of said machine, and a plurality of an L-shaped laminated members each being attached at one end to each of said bars and at the other end to said end ring means for absorbing such movement and for providing electrical connection between said bars and said end ring means.

4. The combination according to claim 3 wherein said L-shaped member is attached at one end to said bar at a position between said rotor and said end ring means and at its other end to the inner peripheral surface of said end ring means.

5. The combination according to claim 3 wherein said bars are of a length sufficient to extend through said end ring means, and each of said L-shaped members are connected at one end to the exposed end of said bars and at their other ends to the inner peripheral surface of said end ring means.

6. The combination according to claim 3 wherein said L-shaped members are attached at one end to an inwardly directed surface of each of said bars and at their other ends to a side of said end ring means.

7. An amortisseur winding for use with a dynamoelectric machine comprising a plurality of bars adapted for positioning around the outer peripheral surface of a rotor for said machine, end ring means positioned adjacent each end of said rotor and being arranged for contact by said bars, a plurality of bifurcated members, each being positioned to straddle its respective bar and having its free ends firmly attached to said bars while the other end of said member terminates adjacent said end ring means, and connecting means coacting with each of said members and said end ring means to firmly anchor said member to said end ring means.

8. An amortisseur winding for use with a dynamoelectric machine comprising a plurality of bars adapted for positioning around the outer peripheral surface and arranged to extend beyond the ends of a rotor for said machine, a plurality of end rings positioned adjacent said bars on opposite sides of said rotor, and means connecting each alternating bar to a respective end ring for eliminating the effects of differential thermal expansion in said bars created during operation of said machine.

9. An amortisseur winding for use with a synchronous machine comprising a plurality of bars adapted for positioning around the outer peripheral surface of a rotor for said machine and end ring means positioned adjacent each end of said rotor, said bars being arranged in groups wherein each group is adapted to overlie each of the poles of said rotor, means connecting each of the outermost bars in each group directly to said end ring means, means in said end ring means coacting with the innermost bars to permit differential thermal expansion of said innermost bars in said end rings, and flexible means connecting each of said bars to the end ring means for absorbing movement of the bars resulting from said expansion and for providing proper electrical connection between the bars and said end ring means.

10. An amortisseur winding for use with a dynamoelectric machine comprising a plurality of bars positioned on pole pieces on the outer surface of a rotor for said machine, end rings positioned adjacent each end of said rotor, means supporting said end rings and positioning the same in a plane perpendicular to the axis of said machine, said means comprising a plurality of openings in said end rings for loosely receiving the exposed ends of said bars so that the bars support the end rings while simultaneously being capable of movement longitudinally therein during expansion and contraction, a shoulder formed adjacent the ends of each of said bars for abutting said end rings and thereby causing said end rings to assume a position perpendicular to the machine axis, and a conductor flexibly interconnecting each of said bars with said end rings for absorbing said longitudinal movement in providing proper electrical connection between said bars and said end rings.

References Cited in the file of this patent

UNITED STATES PATENTS

| 1,174,563 | Glass et al. | Mar. 7, 1916 |

FOREIGN PATENTS

| 99,163 | Austria | Feb. 10, 1925 |